United States Patent [19]

Cantenot

[11] 4,099,633

[45] Jul. 11, 1978

[54] DEVICE FOR EVACUATION OF SOLID MATERIALS

[76] Inventor: Paul Cantenot, 39450 Parcey, Parcey, Jura, France

[21] Appl. No.: 765,602

[22] Filed: Feb. 4, 1977

[30] Foreign Application Priority Data

Feb. 23, 1976 [FR] France ................. 76 05688

[51] Int. Cl.² ............................................. B65G 65/38
[52] U.S. Cl. ................. 214/17 DA; 198/631; 222/412
[58] Field of Search ............... 214/17 DA; 222/412, 222/413; 198/631

[56] References Cited

U.S. PATENT DOCUMENTS

| | | | |
|---|---|---|---|
| 1,274,548 | 8/1918 | Holnagel et al. | 214/17 DA X |
| 1,570,085 | 1/1926 | Saxe | 198/631 X |
| 2,755,942 | 7/1956 | Broberg | 214/17 DA |
| 3,050,201 | 8/1962 | Humphrey | 214/17 DA |
| 3,237,788 | 3/1966 | Weaver et al. | 214/17 DA |
| 3,532,232 | 10/1970 | Sukup | 214/17 DA |
| 3,908,839 | 9/1975 | Menaut | 214/17 DA |

*Primary Examiner*—Albert J. Makay
*Attorney, Agent, or Firm*—Browdy & Neimark

[57] ABSTRACT

A device for evacuation of powder or granular materials stored on sheltered or unsheltered floors or in bins has a fixed frame, at the center of the storage floor or bin, situated above an evacuation orifice and below a protective cap covered by the stored material. The frame serves to support an evacuation mechanism proper comprising two worms of opposite pitch which extend essentially along a diameter of the storage area and which are provided with a continuous rotational movement about their axes and a discontinuous and alternating movement of essentially 180° about a vertical axis.

4 Claims, 4 Drawing Figures

DEVICE FOR EVACUATION OF SOLID MATERIALS

FIELD OF THE INVENTION

The present invention relates to a device for evacuation, on demand, of solid materials, particularly those in powder or granular form stored on sheltered or unsheltered floors or in containers such as bins or silos.

BACKGROUND OF THE INVENTION

In order to extract a material heaped on a floor or in a bin, it is known to provide, in the center of the floor or bin, an orifice communicating with an evacuation pipe placed at a lower level, and to install above the plane of this floor or bin bottom an evacuation system or "extractor" composed of a worm parallel to this floor or bottom and provided both with rotational movement about its own axis and rotational movement about a vertical axis. The effect of this worm is to gather material from the various lower zones of the storage floor or bin and gradually to bring this material to the evacuation orifice.

Although they are simple of themselves, these extraction systems raise two problems: clogging of the material in the evacuation orifice, and maintenance of the worm-drive mechanism.

To resolve the clogging problem, it has been suggested that, above the evacuation orifice and the drive mechanism, a protective cap be provided, usually conical in shape, enabling the material to form a natural heap all around the evacuation orifice. To resolve the problem of maintaining the mechanism, it has been suggested to support the mechanism and the cap by a hollow beam traversing the storage floor or the bin and providing free access to the mechanism.

Systems improved in this way, however, have the disadvantage of being economically feasible only for storage floors or bins with diameters of no more than about ten meters. Above this dimension, it is necessary to use beams which, if they are to be of sufficient mechanical strength, must be of such dimensions and weight that they are very difficult to maintain and are excessive in cost.

Thus, to date there have been no evacuation devices which combine lightness, economy, and effectiveness.

SUMMARY OF THE INVENTION

The present invention solves these problems of the prior art. The evacuation device of the present invention is appropriate for diverse solid materials — powdered, granular, or in lump form — stored either on simple covered or uncovered floors or in bins. Although the invention is described hereinbelow in the case of its application to bins designed for storing powdered products, this is only for purposes of simplification and does not constitute a limitation of its field or application.

According to the present invention, at the center of the storage floor or bin, there is a fixed frame situated above an evacuation orifice and below a protective cap covered by the stored material. The frame serves to support an evacuation mechanism proper comprising two worms of opposite pitch which extend essentially along a diameter of the storage area and which are provided with a continuous rotational movement about their axes and a discontinuous and alternating movement of essentially 180° about a vertical axis.

According to one embodiment of the extractor of the invention, the two worms are placed so that each is an extension of the other on either side of a transmission system which receives its movement from a motor and set of reduction gears accommodated in a housing which is traversed by the control shaft of the worms and is pivotably mounted on vertical shaft bearings supported by a fixed frame. A motor and gear drive impart an alternating movement, involving angular displacement, to the housing and hence to the worms and is integral with the fixed frame. The fixed frame is equipped, at its upper part, with a cap to protect the aforesaid mechanism and, at its lower part, with a funnel to evacuate the extracted material.

While the motor and set of reduction gears imparting a continuous rotational movement to the two worms functions continuously, the motor and gear drive imparting a discontinuous movement involving angular displacement to these worms is associated with travel-limiting switches which reverse its direction of rotation when the worms arrive at the end of their swing.

BRIEF DESCRIPTION OF THE DRAWINGS

The attached schematic drawing represents one embodiment of this extractor in the case of its application to a bin as a non-limiting example.

DETAILED DESCRIPTION OF PREFERRED EMBODIMENTS

Figure 1:
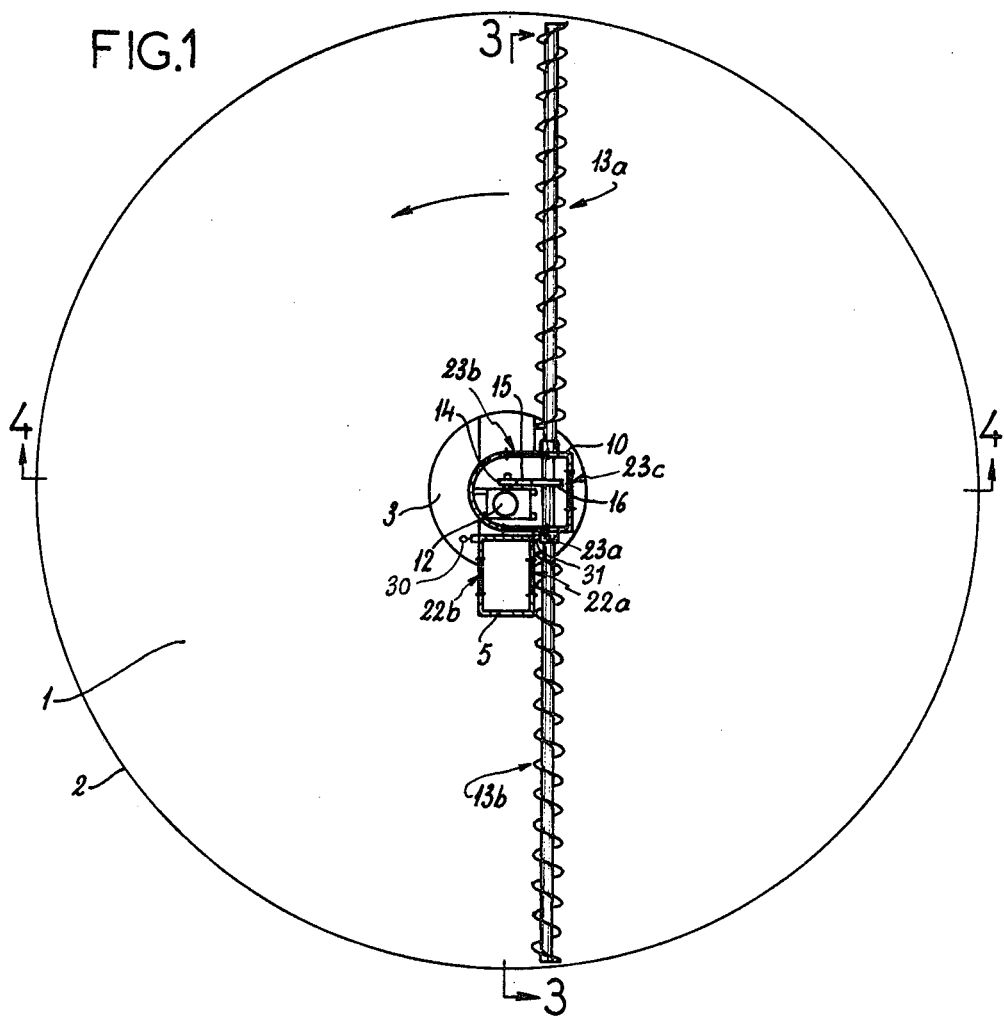
FIGS. 1 and 2 are horizontal sections along line 1—1 of FIG. 3, showing the worms of the extractor in the two end-of-swing positions.
Figure 4:
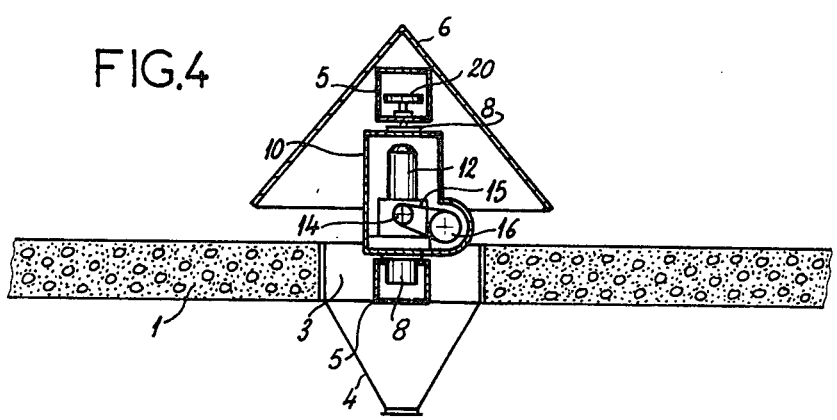
FIGS. 3 and 4 are vertical sections along lines 3—3 and 4—4 of FIG. 1, respectively.

In the drawings, 1 and 2 designate respectively the bottom and side wall of the bin, and 3 designates a central orifice provided in the bottom of the bin, which communicates with an evacuation funnel 4 placed below. This orifice 3 is partially traversed by a fixed frame 5 having the general shape of a U lying on one of its arms. The frame 5 serves to support a cap 6 in the shape of a truncated cone, which is inside and in the center of the lower part of bin 1-2.

Frame 5 is also hollow to serve as an accommodation for a motor and gear drive 7. The two arms of frame 5 serve as a support for two bearings in which the ends 9a and 9b of housing 10 rotate about a vertical axis, said housing 10 being situated inside the U delimited by frame 5. Where it crosses orifice 3, the lower part of frame 5 is triangular in shape, vertex upward, in order not to impede the product flow.

This housing 10 serves to accommodate a motor and set of reduction gears 12 and to support two worms 13a and 13b which are extensions of one another and traverse housing 10. The two worms 13a and 13b extend over a length slightly less than the diameter of bin 1-2; and the pitch of one is opposite the pitch of the other.

The motor and set of reduction gears 12 serves to impart a continuous rotational movement to the two worms 13a and 13b; in order to do this, power is transmitted by chainwheel 14, a chain 15, and a gear 16.

The motor and gear drive 7 imparts a separate movement to housing 10, motor and set of reduction gears 12, and worm 13a, 13b by means of a chain 17, a chainwheel 18, pulleys 19 and 20, and a belt 21.

It should be noted, however, that the two worms 13a, 13b and hence housing 10 and motor and reduction gears 12 are not provided with a continuous rotational movement by motor and gear drive 7, but with a discontinuous and alternating rotational movement. The presence of the vertical central part of frame 5 in fact makes it impossible for two worms 13a, 13b to make a complete rotation around a vertical axis. As a consequence, worms 13a, 13b must be provided with an alternating movement involving angular displacement limited such that at the end of their swing the worms do not strike the vertical part of frame 5.

Figure 2:
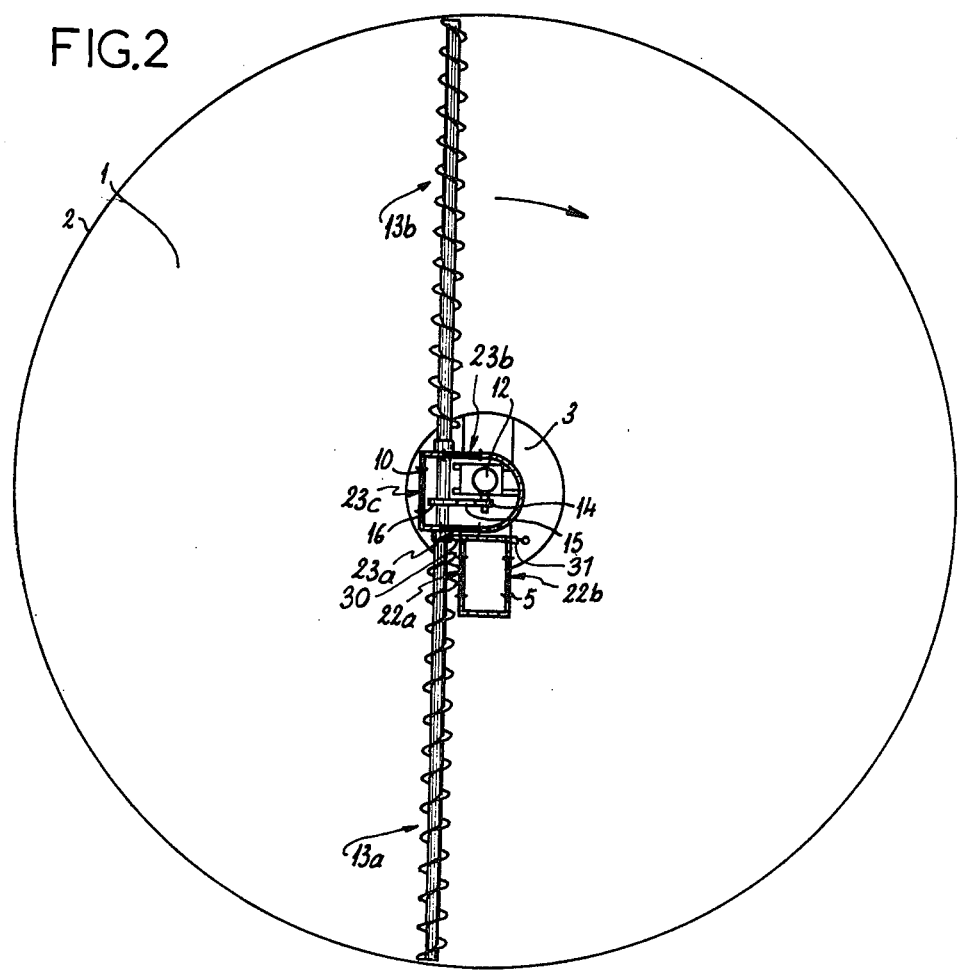
Figure 3:
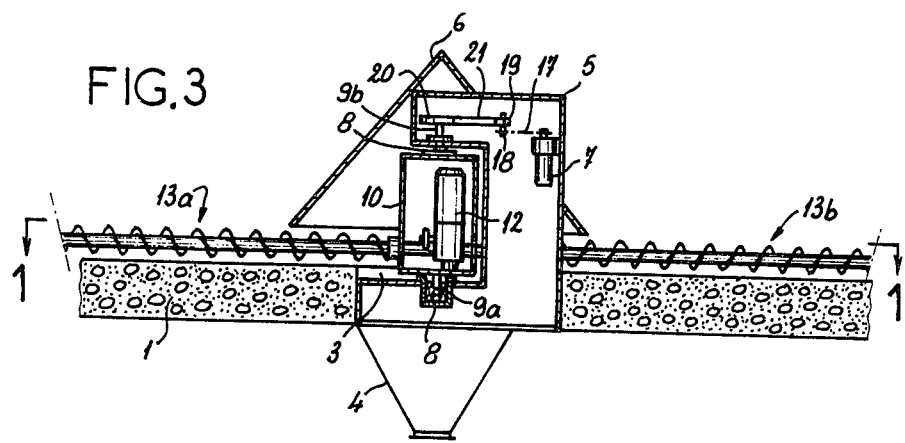

For this purpose, travel-limiting switches 30, 31 are provided on the frame 5 which reverse the direction of rotation of motor and gear drive 7 when the worms arrive at the end of their swing. FIGS. 1 and 2 show the two end-of-swing positions.

Independently of this alternating movement involving angular displacement, worms 13a, 13b are made to rotate about their own axes by motor and reduction gears 12.

Due to the combination of the displacement movement of the worms above the bottom of the bin and the rotational movement of the worms about their own axes, the material stored in the bin is progressively moved toward the center and thus fed successively through orifice 3 and evacuation funnel 4.

It should be noted that the two assemblies 7 and 12 are well ventilated, since hollow frame 5 constitutes a very good air duct. Because it traverses only a half circle, housing 10 is easily connected by flexible air ducts (not shown) which permit cooling of motor and reduction gears 12 installed in housing 10. The motor and reduction gears 12 are driven by electricity supplied by a simple flexible cable.

In addition, because of the dimensions of the frame 5 and due to its being hollow, it will be seen that it is possible, even easy, to have access to the reduction gears as well as to the transmission systems in order to maintain and, if necessary, repair them. Access to frame 5 is provided by two doors 22a and 22b situated one on each side of said frame 5. A man can move under the conical cap 6, whatever the position of the worms, and inspect the mechanical elements contained in housing 10 through doors 23a, 23b, and 23c.

It should, however, be noted that, to facilitate maintenance of the mechanism, it is possible to provide access not from below, but from the side. Since worms 13a, 13b do not sweep absolutely all the surface of the bin and since an unswept zone remains in the lateral extension of frame 5, it is possible to utilize this zone to install a hollow beam extending horizontally from the outside of the bin to the inside of frame 5, thus permitting easy access to the inside of the beam and hence to the various mechanisms of the extractor. It should be noted that since the bottom of the bin is clear for the entire radius extending frame 5, the hollow beam mentioned hereinabove rests on the floor for its entire length, enabling it to be built very economically. Moreover, it can have a triangular section, thus favoring total emptying of the bin, since it prevents any product from being deposited in the zone not swept by the worms.

Alternatively, total sweeping can be obtained by conferring a triangular shape on the horizontal section of frame 5 so that the extreme positions of the worms intersect.

It goes without saying that the invention is not confined to the single embodiment of this device for evacuating solid materials described hereinabove and represented as an example; on the contrary, it covers all alternative embodiments, and in particular extends its field of application to the case where the two worms are supported parallel to one another by two independent housings which are placed one on each side of a central frame and each of which contains a mechanism for driving a worm rotationally and are each provided with an alternating movement involving angular displacement, giving the worm its sweeping movement. Moreover, two reductin gear sets placed in the center of the frame will suffice to develop the two movements of the two worms.

What is claimed is:

1. A device for evacuating solid materials stored on a covered or uncovered floor or in a bin, through an evacuation orifice in the center of such floor or bin, comprising:

a fixed, non-rotatable frame disposed above the evacuation orifice;

a protective cap disposed above said fixed frame to protect said frame from the stored materials;

an evacuation mechanism supported for rotational movement about a vertical axis through the evacuation orifice by said fixed frame, said evacuation mechanism comprising two horizontally extending worms, each having opposite pitches and together extending substantially to the diameter of the storage area, and first rotation means for providing said worms with a continuous rotational movement about the axes thereof; and second rotation means, connected to said fixed frame, for causing an automatic discontinuous alternating movement of said worms of substantially 180° around said vertical axis.

2. A device in accordance with claim 1, wherein said fixed frame includes vertical shaft bearings mounted thereon, wherein said evacuation mechanism further includes a housing pivotally mounted between said vertical shaft bearings, said worms being fixedly disposed with respect to said housing such that each worm extends the other on each side of said housing, wherein said second rotation means comprises a motor and gear drive means connected to said fixed frame for imparting said discontinuous alternating movement, involving angular displacement, to said housing and hence to said worms, and wherein said first rotation means comprises a second motor and transmission means within said housing for providing said worms with a continuous rotational movement about the axis thereof.

3. A device in accordance with claim 1, wherein said second rotation means includes travel-limiting means for causing the direction of rotation of said worms about said vertical axis to be reversed at each end of the swing of said worms.

4. A device in accordance with claim 1, wherein said fixed frame is supported on the floor or the floor of the bin in the vicinity of the evacuation orifice.

* * * * *